July 5, 1949.    L. C. HUFF    2,475,025
REACTOR FOR CLOSE TEMPERATURE CONTROL
Filed Oct. 26, 1946
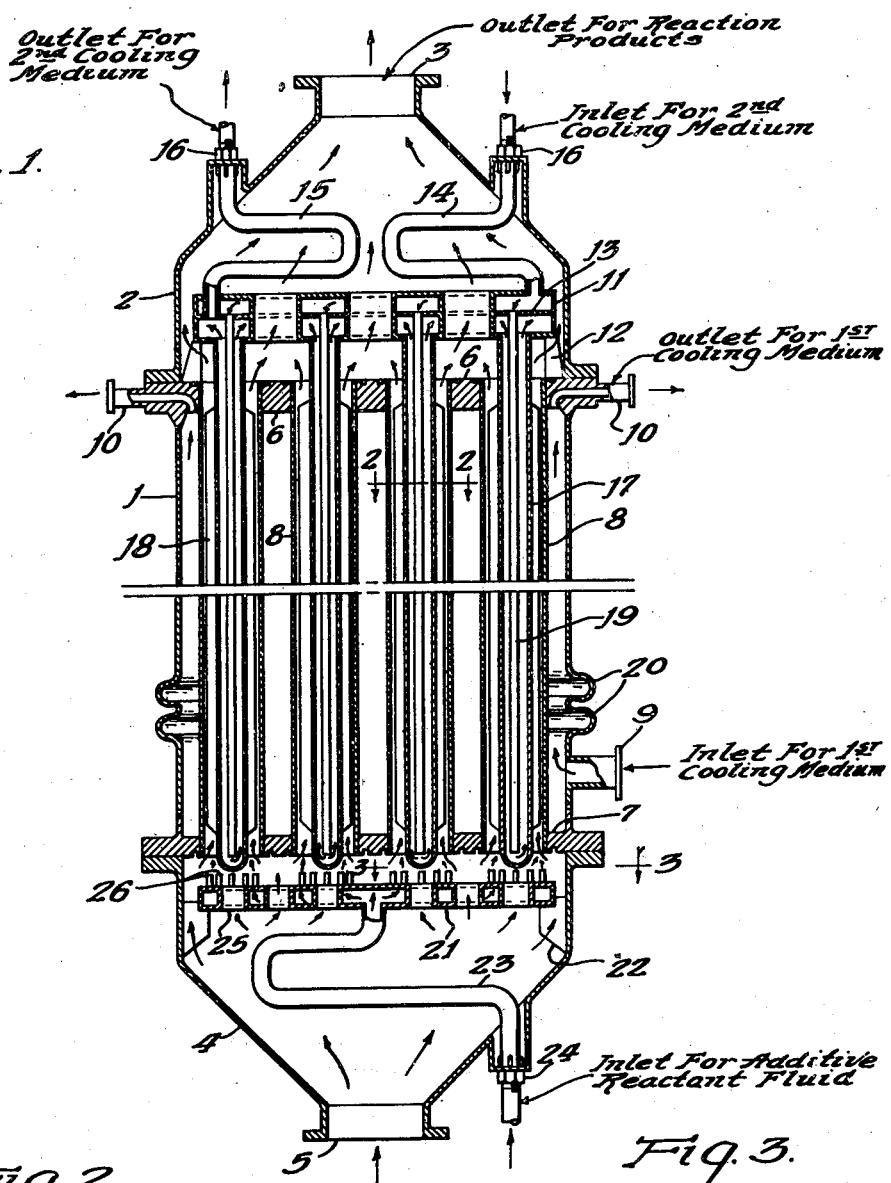
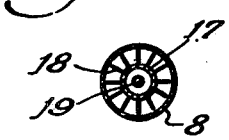
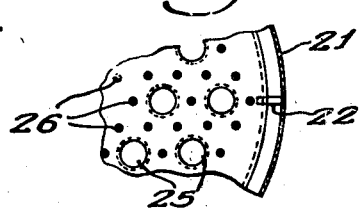
Inventor:
Lyman C. Huff
By: Maynard P. Venema
Attorney Patented July 5, 1949

2,475,025

UNITED STATES PATENT OFFICE 2,475,025

REACTOR FOR CLOSE TEMPERATURE CONTROL

Lyman C. Huff, Evanston, Ill., assignor to Universal Oil Products Company, Chicago, Ill., a corporation of Delaware Application October 26, 1946, Serial No. 705,835

3 Claims. (Cl. 260—449.6)

This invention relates to an improved method of conducting highly endothermic or exothermic fluid catalytic reactions and to an improved type of contactor or reactor providing for close temperature control therein by means of heat exchange mediums flowing in indirect contact with the reaction zone. The construction and arrangement of the chamber is such that a plurality of passageways or tubular zones are provided for the flow and contact of the reactant materials, while two heat exchange channels are provided in combination with these tubular contacting zones in a manner such that the temperature within the reaction zone may be very closely controlled, whether the process reaction be exothermic or endothermic.

It is the principal object of this invention to provide an improved method of contacting and conducting fluidized catalyst reactions wherein the temperature of reaction may be vary closely controlled.

Another object of this invention is to provide a reactor having provisions for two cooling or heating fluid mediums flowing in two different flow paths and in efficient heat exchange relationship with the reaction zones.

It is a still further object, to provide a reactor having a plurality of tubular passageways or flow channels for contacting reactant materials, with the construction and arrangement being such that one cooling medium surrounds the exterior of the reactant flow channels while a second cooling or heating medium circulates centrally within tubular passageways or contacting zones.

Broadly, this invention provides a method for conducting catalytic reactions which comprises passing a fluid reactant stream containing finely divided particles suspended therein into a reaction zone, dividing the suspension into a plurality of smaller confined and substantially annular shaped streams within said reaction zone, uniformly distributing another reactant stream into said plurality of streams, passing the admixture through said reaction zone and passing a fluid medium in indirect heat exchange relationship internally and externally with said annular shaped streams to control the reaction temperature therein.

One embodiment of the reactor of this invention comprises in combination an elongated enclosed chamber having an inlet at one end thereof for fluid reactants and an outlet at the opposite end thereof for reaction products, a tube sheet or partitioning member across each end of said chamber and tubular members connecting therebetween such that there is provided thereby an intermediate contacting zone and separated end zones, said tubular members provide communicating passageways between the end zones and a plurality of elongated and small diameter contact zones for fluid or fluidized reactant materials, while the space within the chamber, around the tubular members and between the tube sheets, is provided with inlet and outlet means to in turn permit circulation of a heat exchange fluid medium around the plurality of tubular contact zones and a tubular element suspended centrally within each of the tubular contact zones, said elements connecting with inlet and outlet fluid headers and providing means for the passage of a second heat exchanger medium internally within the flow streams which pass through the plurality of tubular contact zones. Each of the tubular elements provided for this second heat exchange mediums, are preferably constructed with a plurality of fins radiating therefrom such that a large amount of heat exchange surface will project into the flow channels of the reactant.

In another form or embodiment of the reactor, distribution means is provided to charge an additive fluid stream to the principal reactant stream that is being charged to the reactor chamber and flows through the plurality of tubular contact zones. This distributing means, for the additive fluid, comprises a header, an inlet conduit thereto, and a plurality of small discharge nozzles. Also, these discharge nozzles are specially arranged to distribute the additive fluid medium into the inlet end of each of the tubular passageways or reactant contact zones, such that the additive fluid is uniformly distributed into the reactant fluid streams.

Many chemical reactions require very close temperature control and it is the principal feature of this reactor to provide this desired close temperature control to the contacting zone. The method of contacting reactants and the construction and arrangement of the apparatus is such that there is provided this close temperature control whether the reaction be exothermic or endothermic. As previously noted, temperature control is provided at the reaction zone by means of two different flow paths for cooling, or heating, heat exchange mediums. One heat exchange medium flows internally within the path of each of the reactant fluid streams, while the other circulates externally around each of the tubular contacting zones. Two different heat exchange fluid mediums may be employed within the reactor, or of course, it is possible to use the same cooling, or heating, medium in the inner and outer heat exchange zones.

Heat exchangers or reactors having two heat exchange streams have been made for fixed contact bed reaction zones, but have not been provided suitable to accommodate fluidized solids and vaporous reactants. The reactor of this invention, which will be hereinafter described, is very adaptable for liquid to liquid heat exchange, for liquid to vapor heat exchange, or for certain fluidized catalytic processes wherein fluid reactant materials are contacted in the gaseous or vaporous phase and in the presence of a finely divided catalytic material. Fluidized processes in general, and their method of operation, are now well known to the petroleum and chemical industries and need not be described in detail here.

The accompanying drawing and following description thereof will serve to more fully explain the construction, arrangement and operation of the improved reactor chamber and the fluid contacting method of this invention.

Figure 1 of the drawing is a cross-sectional, elevational view through the reactor chamber.

Figure 2 is a sectional plan view through a portion of the reactor, showing in cross-section one of the plurality of contacting zones and internal heat exchange tubular elements as indicated by line 2—2.

Figure 3 shows in plan view a portion of the lower header and distribution nozzles which are provided to distribute an additive fluid to the reaction zone, as indicated by line 3—3.

Referring now to the drawing, the reactor chamber comprises shell 1, an upper head 2 having an outlet nozzle 3 and a lower head 4, having an inlet nozzle 5. The chamber is partitioned internally by means of tube sheets 6 and 7, and between these two sheets are a plurality of tubular members 8. These tubular members 8 are sealed at their ends to the tube sheets 6 and 7, such that a flow stream entering the inlet nozzle 5 is divided into a plurality of contact zones, being substantially uniformly distributed to each of the tubular members, prior to being discharged from the upper head 2, and the chamber, by the way of outlet nozzle 3. The tube sheets 6 and 7 also provide an intermediate cooling zone within the shell 1 around the exterior of the tubes 8. An inlet nozzle 9, connecting with the shell 1, provides a means to charge a cooling, or heating, medium to this intermediate zone, while outlet nozzles 10, in the upper tube sheet 6, provide means for discharging the heat exchange medium from this intermediate zone. In the particular form of apparatus shown, the outlet nozzles 10 are constructed integrally within the tube sheet 6, such that efficient use of the intermediate cooling space is utilized for the heat exchange medium. This construction, however, may be altered to have discharge nozzles 10 placed in the body of the shell 1 in a more conventional manner, similar to the attachment of the inlet nozzle 9.

A distributing header 11 is positioned within the upper head 2 and is supported from header 6 by means of supporting members 12. This header accommodates a second cooling or heating fluid medium and is partitioned by means of an internal diaphragm 13. This second heat exchange medium may be charged to the header 11 through inlet conduit 14 and discharged therefrom by means of outlet conduit 15. Each of these conduits pass through the upper head 2 and are connected thereto by means of locknuts 16 or other attachment and sealing means. Suspended within each of the contact zones, provided by tubular members 8, is a tubular element 17, which is closed at its lower end and is provided with a plurality of radial fins 18. The fins 18 project outwardly from the tube and extend longitudinally for the entire portion of the tube within the reaction zone. The upper end of each of the tubes 17 connects with header 11 and communicates with the lower portion thereof. Internally within each of the tubular members 17 is a small tube or conduit 19. The tubes 19 are suspended from the inner diaphragm 13 of header 11 such that each one communicates with the upper portion of the partitioned header.

In operation, a heat exchange fluid medium enters conduit 14 and is distributed to each of the smaller tubes 19, to in turn be discharged from the lower ends thereof to the bottom of closed tubes 17. The fluid medium thus reverses flow and passes upwardly in an annular channel, between the two tubes 17 and 19, to return to the header 11 and be discharged therefrom by way of outlet conduit 15. The plurality of radial fins 18 project from the tubes 17 into each of the contact zones of tubes 8, such that an enlarged effective cooling, or heating, area is provided on each of the tubes 17.

The conduits 14 and 15 are each provided with an expansion type of bend or loop such that differential expansions between the chamber wall and the internally supported heat exchange elements may be accommodated. Corrugations 20 are also provided in the shell 1 in order to accommodate differential expansions due to temperature, which may occur between the internally positioned tubes 8 and the outer shell 1.

Within the lower head 4, there is provided a second distribution header 21 for charging an additive fluid to the reactant stream. This header 21 is supported from the chamber wall by means of supporting lugs 22 and is fed by means of an inlet conduit 23 which extends through the chamber head 4. The conduit 23 is sealed to and supported from the head 4 by means of locknut 24. The header 21 is provided with a plurality of spaced openings or holes 25 and a plurality of discharge nozzles 26. The holes 25 provide means for the fluid reactant materials to pass upwardly through the header into the elongated contacting zones of the tubular members 8 and the small discharge nozzles 26 are specially arranged to have a fluid medium, entering by way of conduit 23, uniformly discharged into the end of each of the tubular members 8. This arrangement makes it possible to add another fluid medium to the fluid reactant stream at the entrance to each of the contact zones and at a point where, cooling or heating, heat exchange fluid mediums are moving in indirect contact with the reaction products to control the processing temperature of the reactant materials as they pass through the reaction zone. By proper control of the temperatures of the fluid heat exchange mediums that enter the intermediate zone by way of nozzle 9 and the internal tubular element 17 by way of inlet conduit 14, the temperature within the processing zones may be very closely controlled to give a desired chemical reaction. Reaction products from the upper ends of each of the tubes 8 pass through the openings within the header 11 to enter the upper head 2 of the chamber and be discharged, by way of outlet 3, to suitable fractionating or receiving equipment.

In a specific example, the advantageous use of the method of contacting and the improved reactor can be described in connection with a fluidized Fischer-Tropsch process, or hydrocarbon formation operation, whereby hydrocarbons are formed from carbon monoxide and hydrogen in the presence of a powdered or other finely divided type of catalyst. Carbon monoxide is supplied to the lower end of the reactor chamber through inlet 5 and carries with it a fluidized or suspended catalytic material. Carbon monoxide may be formed in a suitable generator or provided in a carbon monoxide containing stream at a point remote from the reactor, and circulated to the reactor in a manner to pick up and fluidize finely divided catalyst particles which are fed to the process from suitable storage hoppers or from a catalyst regenerating chamber. The mixture of carbon monoxide and catalyst particles passes upwardly through the holes 25 of header 21 and into the plurality of tubular passageways, or contact zones, provided within tubes 8 and simultaneously hydrogen may be discharged to the lower end of each of the passageways by means of the inlet conduit 23, the header 21 and the plurality of discharge nozzles 26. The reaction of this Fischer-Tropsch process is exothermic and requires a very close temperature control to obtain an efficient conversion into hydrocarbon materials, thus cooling mediums are charged to each of the heat exchange zones provided within the reactor. One cooling medium, entering by way of nozzle 9, flows around the tubes 8 in the intermediate zone of the chamber in a direction substantially concurrent with the flow of the reactant materials through the tubes 8. The second cooling medium, entering by way of inlet conduit 14, header 11 and internally placed tubes 19, is discharged within the lower end of tubes 17, thus this second medium reverses its direction of flow and passes upwardly through the finned tube 17, also in a direction concurrent with the reactant stream, but in indirect heat exchange relation therewith. The cooling or heating mediums which are externally and internally placed with respect to the fluid reactant stream, may be of different materials and may be of differing inlet temperatures. The flow path and channels for these heat exchange mediums are constructed in a pressure tight manner and in operation any desired type of cooling or heating medium may be employed in the reactor, for example, such common mediums as water, steam, or "Dowtherm" may be employed.

From the above description of the reactor, comprising this invention, it may be seen that there is provided a contacting chamber that will carry out processes requiring closely controlled temperatures. However, it may be further noted that the invention should not be limited to the exact construction features which are illustrated in the drawing and have been described in connection therewith, for minor construction details and mechanical substitutions within various portions of the reactor may well be made and remain within the scope of this invention.

I claim as my invention:

1. A method for conducting catalytic reactions which comprises passing a fluid reactant stream containing finely divided particles suspended therein into a reaction zone, dividing the suspension stream into a plurality of smaller confined and substantially annular shaped streams within said reaction zone, uniformly distributing another reactant stream into said plurality of streams, passing the admixture through said reaction zone and passing a fluid medium in indirect heat exchange relationship internally and externally with said annular shaped streams immediately upon introduction of said other reactant stream to the annular streams.

2. A method of conducting a fluidized catalytic reaction between carbon monoxide and hydrogen containing streams to form hydrocarbon vapors which comprises passing a carbon monoxide containing stream to a reaction zone, injecting finely divided catalyst particles into said carbon monoxide stream whereby the latter transports said catalyst particles to said reaction zone, dividing the mixture into a plurality of smaller confined and substantially annular shaped streams, uniformly distributing a hydrogen containing stream into each of said plurality of divided streams and passing the admixture through said reaction zone, passing a cooling fluid in indirect heat exchange relationship internally and externally with said annular shaped streams immediately upon introduction of said other reactant stream to the annular streams, and separating hydrocarbon reaction products from the catalyst particles following their discharge from said reaction zone.

3. A contacting and heat exchange apparatus comprising in combination, an elongated chamber having an inlet at one end thereof and an outlet at the other end thereof, a pair of spaced tube sheets within said chamber and forming therein an intermediate compartment, a group of open-ended tubes extending through said compartment between said tube sheets, means for passing a heat exchange fluid through said compartment around said tubes, a second group of tubes of smaller diameter than the tubes of the first group, each having a closed end and being disposed within and spaced from a corresponding tube of said first group, means for passing a heat exchange fluid through the tubes of said second group and comprising a header compartment extending across the chamber between one of said tube sheets and said outlet of the chamber, a plurality of spaced openings through said header compartment establishing communication between said open-ended tubes and said outlet, a distribution header extending across the chamber between the other of said tube sheets and said inlet to the chamber, a plurality of spaced openings through the last-named header for passage of fluid from said inlet to said open-ended tubes, said distribution header having an inlet conduit for additional fluid and a plurality of discharge nozzles directed toward said open-ended tubes.

LYMAN C. HUFF.

REFERENCES CITED

The following references are of record in the file of this patent:

UNITED STATES PATENTS

| Number | Name | Date |
|---|---|---|
| 468,776 | Morrell | Feb. 9, 1892 |
| 544,437 | Kleemann | Aug. 13, 1895 |
| 2,034,715 | Dreyfus | Mar. 24, 1936 |
| 2,134,058 | Ris | Oct. 25, 1938 |
| 2,224,049 | Herbert | Dec. 3, 1940 |
| 2,255,126 | Myddleton | Sept. 9, 1941 |
| 2,266,161 | Campbell et al. | Dec. 16, 1941 |